United States Patent [19]

Katz et al.

[11] 3,960,860

[45] June 1, 1976

[54] 2-METHYL-5,7-DIHYDROTHIENO-[3,4d]-PYRIMIDINE

[75] Inventors: Ira Katz, West Long Branch; Richard A. Wilson, Westfield; William J. Evers, Middletown; Manfred H. Vock, Locust, all of N.J.; Gerrit W. Verhoeve, Feucherolles, France

[73] Assignee: International Flavors & Fragrances Inc., New York, N.Y.

[22] Filed: Jan. 15, 1975

[21] Appl. No.: 541,259

Related U.S. Application Data

[60] Continuation-in-part of Ser. No. 321,973, Jan. 8, 1973, abandoned, which is a division of Ser. No. 66,110, Aug. 21, 1970, Pat. No. 3,726,692.

[52] U.S. Cl. ............................................. 260/251 A
[51] Int. Cl.² ........................................ C07D 495/04
[58] Field of Search ................................. 260/251 A

[56] References Cited
UNITED STATES PATENTS

| | | | |
|---|---|---|---|
| 3,272,811 | 9/1966 | Ohnacker et al. | 260/247.1 |
| 3,764,601 | 10/1973 | Evers | 260/251 A |

*Primary Examiner*—Alton D. Rollins
*Assistant Examiner*—Diana G. Rivers
*Attorney, Agent, or Firm*—Arthur L. Liberman; Harold Haidt

[57] ABSTRACT

This application relates to 2-methyl-5,7-dihydrothieno-[3,4d]-pyrimidine, which is useful for flavoring foodstuffs or tobacco compositions and altering the fragrance of perfume compositions.

1 Claim, No Drawings

2-METHYL-5,7-DIHYDROTHIENO-[3,4D]-PYRIMIDINE

This is a continuation-in-part of application Ser. No. 321,973 filed on Jan. 8, 1973, now abandoned, which in turn is a division of application Ser. No. 66,110 filed on Aug. 21, 1970, now U.S. Pat. No. 3,726,692.

BACKGROUND OF THE INVENTION

The present invention relates to a certain heterocyclic pyrimidine and its use in processes and compositions for altering the flavors and aromas of various materials such as tobaccos, foodstuffs, and the like, as well as the novel pyrimidines and processes for producing them.

Because of the tremendous consumption of foods, tobaccos, and other materials, there has been an increasing interest in substances and methods for imparting flavors to such consumable materials. This interest has been stimulated not only because of the inadequate quantity of natural flavoring materials available, but perhaps even more importantly, because of the need for materials which can combine several nuances, will be more stable than natural materials, will blend better with other flavors or flavoring composition components, and will generally provide superior products.

Various pyrimidines containing 4-substituents have been shown in the art, but no flavoring, enhancing or other organoleptic properties have been shown or suggested. Thus, U.S. Pat. No. 3,272,811 shows a variety of pyrimidine.

THE INVENTION

It has been found that 2-methyl-5,7-dihydrothieno-[3,4d]-pyrimidine having the formula:

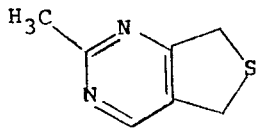

is capable of imparting a wide variety of flavors to various consumable materials.

This material is a colorless crystalline material melting at 64.5°–65°C having a powerful odor of roasted fresh, sweet nut with a definite popcorn character. This pyrimidine is particularly suitable for flavoring foodstuffs since it is less toxic and less potent than other analogs, such as its chloroanalog, namely, 2-methyl-4-chloro-[3,4-d]-pyrimidine.

The novel pyrimidine prepared according to the present invention can be obtained by reductive dehalogenation of the corresponding 4-chloropyrimidine with zinc dust or by catalytic hydrogenation. The dehydrogenation with zinc dust is preferably carried out in a reaction vehicle, desirably a lower alkanol such as ethanol in the presence of an acidic material such as ammonium chloride. The reaction is desirably carried out so as to require a time of one to two hours, and about 1.5 hours is preferred.

When the dehalogenation is carried out by catalytic hydrogenation, it can also be carried out in the presence of an inert reaction vehicle. Thus, alkanol, especially lower alcohols such as ethanol and methanol, can be used. Suitable catalysts include palladium or barium carbonate.

It will be understood according to the present invention that the intermediate and the final product prepared herein can be neutralized, washed, and dried to purify and cleanse the desired substances. The bicyclic pyrimidine can be obtained in purer form or in substantially pure form by conventional purification techniques. Thus, the product can be purified and/or isolated by distillation, extraction, crystallization, preparative chromatographic techniques, and the like.

It will be appreciated from the present disclosure that the bicyclic pyrimidine according to the present invention can be used to alter, vary, fortify, modify, enhance, or otherwise improve the flavor of a wide variety of materials which are ingested, consumed, or otherwise organoleptically sensed. The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor impression to modify organoleptic character.

Said pyrimidine is accordingly useful in flavoring compositions. Such a composition is taken to mean one which contributes a part of the overall flavor impression by supplementing or fortifying a natural or artificial flavor in a material, as well as one which supplies substantially all the flavor and/or aroma character to a consumable article. The bicyclic pyrimidine of our invention is particularly useful in adding sweetness and nut notes to artificial essential oils, peppermint oil and spearmint oil. It is also suitable for rounding out and improving the character of nut, bread, and vanilla flavoring compositions.

The term "foodstuff" as used herein includes both solid and liquid ingestible materials for man or animals, which materials usually do, but need not, have nutritional value. Thus, foodstuffs includes meats, gravies, soups, convenience foods, malt and other alcoholic or nonalcholic beverages, milk and dairy products, nut butters such as peanut butter and other spreads, seafoods including fish, crustaceans, mollusck and the like, candies, breakfast foods, baked goods, vegetables, cereals, soft drinks, snack foods, dog and cat foods, other veterinary products, and the like.

The term "tobacco" will be understood herein to mean natural products such as, for example, burley, Turkish tobacco, Maryland tobacco, flue-cured tobacco and the like including tobacco-like or tobacco-based products such as reconstituted or homogenzied leaf and the like, as well as tobacco substitutes intended to replace natural tobacco, such as lettuce and cabbage leaves and the like. The tobaccos and tobacco products include those designed or used for smoking such as in cigarette, cigar, and pipe tobacco, as well as products such as snuff, chewing tobacco, and the like.

When the bicyclic pyrimidine according to this invention is used in a flavoring composition, it can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus nontoxic or otherwise nondeleterious, conventional materials can be used and broadly include other flavor materials, vehicles, stabilizers, thickeners, surface active agents, conditioners and flavor intensifiers.

Such conventional flavoring materials include saturated, and amino acid; alcohols, including primary and secondary alcohols; esters; carbonyl compounds including ketones and aldehydes; lactones; other cyclic organic materials including benzene derivatives, alicycles, heterocyclic such as furans, pyridines, pyrazines and the like; sulfur-containing materials including thiols, sulfides, disulfides and the like; proteins; lipids; carbohydrates; so-called flavor potentiators such as monosodium glutamate, guanylates and inosinates; natural flavoring materials such as cocoa, vanilla, and caramel; essential oils and extracts such as anise oil, clove oil and the like; artificial flavoring materials such as vanillin; and the like.

Stabilizers include preservatives such as sodium chloride, and the like, antioxidants such as calcium and sodium ascorbate, ascorbic acid, butylated hydroxyanisole, butylated hydroxytoluene, propyl gallate and the like, sequestrants such as citric acid, EDTA, phosphates, and the like.

Thickeners include carriers, binders, protective colloids, suspending agents, emulsifiers and the like, such as agar-agar, carrageenan, cellulose and cellulose derivatives such as carboxymethyl cellulose and methyl cellulose, natural and synthetic gums such as gum arabic, gum tragacanth and the like, and other proteinaceous materials, lipids, carbohydrates, starches and pectins.

Surface active agents include emulsifying agents such as mono- and/or diglycerides of fatty acids such as capric acid, caprylic acid, palmitic acid, myristic acid, oleic acid, and the like, lecithin, defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents such as sodium acetate, ammonium bicarbonate, ammonium phosphate, citric acid, lactic acid vinegar and the like; colorants such as carminic acid, cochineal, turmeric, curcumin, approved food and drug dyes, and the like; firming agents such as aluminum sodium sulfate, calcium chloride and calcium gluconate; texturizers, anticaking agents such as aluminum calcium sulfate and tribasic calcium phosphate; enzymes; yeast foods such as calcium lactate and calcium sulfate; nutrient supplements such as iron salts such as ferric phosphate, ferric pyrophosphate, ferrous gluconate and the like, riboflavin, vitamins, zinc sources such as zinc chloride, zinc sulfate, and the like.

The bicyclic pyrimidine, or the composition incorporating it, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The pyrimidine can be incorporated with the carriers by conventional means such as spray-drying, drum-drying, and the like. Such carriers can also include materials for coacervating the pyrimidine (and other flavoring ingredients, as present) to provide encapsulated products. When the carrier is an emulsion, the flavoring composition can also contain emulsifiers such as mono- and diglycerides of fatty acids and the like. With these carriers or vehicles, the desired physical form of the composition can be prepared.

It will be understood by those skilled in the art that the bicyclic pyrimidine can be added to the materials to be flavored at any convenient point in the production of the finished product. Thus, when the pyrimidine is used to alter or otherwise vary the flavor of a foodstuff, it can be added in the original mixture, dough, emulsion, batter, or the like prior to any cooking or heating operation. Alternatively, it can be added at a later stage of processing if volatilization losses would be excessive during the earlier processing.

When the material is used to treat tobacco products for example, the additive can be applied in a suitable manner, as by spraying, dipping, or otherwise. The pyrimidine can be applied during the "casing" or final spray treatment of the tobacco, or they can be applied at some earlier stage of curing or preparation. The quantity of pyrimidine utilized should be sufficient to impart the desired flavor characteristic to the product but on the other hand, the use of an excessive amount of the pyrimidine is not only wasteful and uneconomical but in some instances too large a quantity my unbalance the flavor or other organoleptic property of the product consumed. The quantity used will vary depending upon the ultimate foodstuff, tobacco product, or other consumable product; the amount and type of flavor initially present in the product; the further process or treatment steps to which the product will be subjected; regional and other preference factors; the type of storage, if any, to which the product will be subjected; and the preconsumption treatment, such as baking, frying, and so on, given to the product by the ultimate consumer. Accordingly, the terminology "effective amount" and " sufficient amount" is understood in the context of the present invention to be quantitatively adequate to alter the flavor of the foodstuff, tobacco, or other consumable material.

It is accordingly preferred that the ultimate compositions contain from about $10^{-9}$ part per million (ppm) to about 100 ppm of bicyclic pyrimidine. More particularly, in food compositions it is desirable to use from about $10^{-9}$ to about 0.01 ppm for enhancing flavors and in certain preferred embodiments of the invention, from about 0.01 to about 15 ppm of the pyrimidine is included to add positive flavors to the finished product. On the other hand, tobacco compositions can contain as little as 0.01 ppm and as much as 100 ppm depending upon whether a cigarette tobacco, a pipe tobacco, a cigar tobacco, a chewing tobacco, or snuff is being prepared. All parts, proportions, percentages, and ratios herein are by weight unless otherwise indicated.

The amount of bicyclic pyrimidine to be utilized in flavoring composition can be varied over a wide range depending upon the particular quality to be added to the foodstuff, tobacco, or other consumable material. Thus, the amount of the bicyclic pyrimidine according to the present invention from about 0.1 percent up to 80 or 90 percent can be incorporated in such compositions. It is generally found to be desirable to include from about 0.5 to about 25% of the bicyclic pyrimidines in such compositions.

The thienopyrimidine of this invention is also useful as a fragrance agent. It can be used to contribute a nut-like fragrance. As olfactory agents, the thienopyrimidine of this invention can be formulated into or used as components of a "perfume composition."

A perfume composition if composed of a small but effective amount of the heterocyclic pyrimidine of this invention and an auxiliary perfume ingredient, including, for example, alcohols, aldehydes, ketones, nitriles, esters, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation, and (d) top-notes which are usually low-boiling fresh smelling materials.

In perfume compositions the individual component will contribute its particular olfactory characteristics, but the overall effect of the perfume composition will be the sum of the effect of each ingredient. Thus, the individual compounds of this invention, or mixtures thereof, can be used to alter the aroma characteristics of a perfume composition, for example, by high-lighting or moderating the olfactory reaction contributed by another ingredient in the composition.

The amount of the compound of this invention which will be effective in perfume compositions depends on many factors, including the other ingredients, their amounts and the effects which are desired. It has been found that perfume compositions containing as little as 2% of the compounds of this invention, or even less, can be used to impart a scent odor to soaps, cosmetics, and the other products. The amount employed can range up to 50% or higher and will depend on considerations of cost, nature of the end product, the effect desired on the finished product and the particular fragrance sought.

The thienopyrimidine of this invention can be used alone or in a perfume composition as an olfactory component in detergents and soaps; space odorants and deodorants; perfumes; colognes; toilet waters; bath preparations such as bath oil and bath salts; hair preparations such as lacquers, brilliantines, pomades, and shampoos; cosmetic preparations such as creams, deodorants, hand lotions, and sun screens; powders such as talcs, dusting powders, face powder, and the like. When used as an olfactory component of a perfumed article, as little as 0.01% of one or more of te thienopyrimidine will suffice to impart a nut-like or other seed-like odor. Generally, no more than 0.3% is required.

In addition, the perfume composition or fragrance composition can contain a vehicle or carrier for the thienopyrimidine alone or with other ingredients. The vehicle can be a liquid such as alcohol, glycol, or the like. The carrier can be an absorbent solid such as a gum or components for encapsulating the composition.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 2-Methyl-5,7-dihydrothieno [3,4-d] pyrimidine

A mixture of 55.8 g of 2-methyl-4-chloro-5,7-dihydrothieno-[3,4d]-pyrimidine, 78.5 g of zinc dust, 8.04 g of ammonium chloride, and 840 ml of 67% ethanol if heated at reflux for two hours. After cooling, the insoluble material is removed by filtration.

The solid residue is washed three times with 300 ml of 95% ethanol, and the combined filtrates are concentrated to a volume of about 300 ml. After adding 100 ml of water, the solution is extracted three times with 250 ml portions of methylene chloride. After drying, the solvent is removed in vacuo, leaving crude 2-methyl-5,7-dihydrothieno-[3,4d]-pyrimidine.

Chromatography on 820 g of silicic acid and elution with 1% methanol in methylene chloride and recrystallization from hexane mixed with decolorizing charcoal gives 17 g of pure 2-methyl-5,7-dihydrothieno-[3,4d]-pyrimidine as short, off-white needles melting at 64.5°–65°C.

Mass spectral analysis shows a peak at m/e 152 with peaks, in descending order of intensity at 151, 84, 39, and 124. The $(p+2/p+1)=0.5$. Nuclear magnetic resonance in deuterochloroform shows absorption at 2.71 ppm accounting for three protons; at 4.22, accounting for four protons; and at 8.54, accounting for one proton.

The odor of this pyrimidine in 0.1% alcohol solution on a blotter strip is a sharp, fresh roasted, sweet nut with a popcorn character. At this concentration, the odor seems to disappear because of anosmia. In aqueous solution at 0.001 ppm it has a sweet roasted nut, popcorn character with a light astringency. At 0.003 ppm in water it has a popcorn, roasted peanut flavor with an astringency like peanut skins. At $10^{-6}$ ppm in chicken broth, it accentuates the root vegetable flavor notes.

It has also been found that at levels as low as 10 parts in $10^{12}$ the material begins to enhance the sweetness of foods. By itself at levels of 10 parts in $10^{10}$ it imparts a sweet, pleasant, and non-bitter aftertaste to aqueous solutions. It can thus be used as an enhancer to reduce the quantity of artificial sweeteners required or to permit diminution of the quantity of natural sweeteners such as sugar. The 2-methyl-5,7-dihydrothieno-[3,4d]pyrimidine has an acute oral $LD_{50}$ of $260 \pm 40.0$ mg/kg and the maximum no effective dose or the lowest dosage level at which essentially no signs of toxicity in test animals is observed is 34 mg/kg.

EXAMPLE II

A cheddar cheese flavoring formulation is prepared by admixing the following ingredients in the amounts indicated:

| Ingredient | Amount (parts) |
|---|---|
| Methyl hexyl ketone | 1.5 |
| Diacetyl | 14.2 |
| isoValeric acid | 40.8 |
| Hexanoic acid | 158.9 |
| Butyric acid | 244.8 |
| Caprylic acid | 534.8 |
| Thienopyrimidine produced in Example 1 | 5.0 |

The foregoing cheese formula is incorporated into a bland cream cheese spread and evaluated on crackers. A good sharp cheddar flavor is imparted to the cheese spread.

EXAMPLE III

A nut-like food is prepared according to methods known in the art by blending cottonseed oil, wheat germ, sucrose, and glycerine to a smooth slurry and then adding fresh egg white. To the dispersion is then added a flavoring composition containing the thienopyrimidine of Example I.

The resulting nut-like edible material has a freshly roasted cashew nut flavor and appearance.

EXAMPLE IV

| Compound | Parts |
|---|---|
| Maltol | 3.0 |
| Acetaldehyde (50% in Ethanol) | 20.0 |
| Isobutyraldehyde | 16.0 |
| Isovaleraldehyde | 42.5 |
| Benzyl Alcohol | 10.0 |
| Methyl Sulfide | 0.4 |
| Methyl Disulfide | 0.4 |
| Isobutyl Acetate | 0.1 |
| Isoamyl Acetate | 0.2 |
| Phenylethyl Acetate | 0.6 |
| Diacetyl 10% (in Ethyl Alcohol) | 0.3 |
| Acetophenone | 1.0 |
| Furfural 10% (in Ethyl Alcohol) | 1.0 |
| Benzaldehyde | 1.0 |
| Isoamylalcohol | 0.5 |
| Phenyl Ethyl Alcohol | 3.0 |
| | 100.0 |

A chocolate-like flavor note material is prepared by admixing the following ingredients:

| Compound | Parts |
|---|---|
| 2-Methyl-5,7-dihydrothieno (3,4-d) Pyrimidine | 65 |
| 2,3,5,6-Tetramethyl Pyrazine | 35 |

One part by weight of the chocolate-like flavor note material is intimately mixed with 99 parts of the basic cocoa flavor material. The resulting mixture is then diluted with propylene glycol so as to formulate a 10% propylene glycol solution. The propylene glycol solution is then added to an instant chocolate flavored beverage powder at the rate of 0.2%, thus reproducing therein a characteristic "sweet milk" chocolate taste.

EXAMPLE V

A perfume composition if prepared by admixing the following ingredients:

| Ingredient | Amount (parts) |
|---|---|
| Geranium, Bourbon | 450 |
| Patchouli | 40 |
| Vetivert | 10 |
| Clove | 100 |
| Cassia | 30 |
| Thienopyrimidine of Example I | 40 |
| Lavender | 100 |
| Orris resin | 60 |
| Methylionone | 40 |
| Coumarin | 20 |
| Musk xylene | 30 |
| Terpineol | 100 |

The foregoing mixture is a "transparent" type of fragrance composition. The thienopyrimidine is used to replace 20 parts of caraway essence, and the natural caraway note of the original perfume is retained.

EXAMPLE IV

A bread flavor is prepared by admixing the following ingredients:

| Compound | Parts |
|---|---|
| Lactic Acid | 50 |
| Acetic Acid | 20 |
| Butyric Acid | 2 |
| Propionic Acid | 5 |
| Pyruvic Acid | 3 |
| Ethyl Pyruvate | 2 |
| Iso Valeraldehyde (10% in Propylene Glycol) | 2 |
| Furfural | 12 |
| Benzaldehyde (10% in Propylene Glycol) | 2 |
| 2-Methyl-5,7-dihydrothieno (3,4-d) Pyrimidine | 2 |
| | 100 |

The above flavor is added to a prepared bread mix (at the rate of 0.02%) containing flour, tartaric acid and sodium bicarbonate.

On baking, the resultant bread has excellent "home-baked" cornbread flavor and aroma characteristics, as a result of addition thereto of the 2-methyl-5,7-dihydrothieno (3,4-d) pyrimidine.

EXAMPLE VII

A vanilla flavor is prepared by admixing the following ingredients:

| Compound | Parts |
|---|---|
| Maltol | 2 |
| Vanillin | 12 |
| Ethyl Vanillin | 3 |
| Anisaldehyde (1% in Propylene Glycol) | 1 |
| Propylene Glycol | 70 |
| Ethanol (95%) | 12 |
| 2-Methyl-5,7-dihydrothieno (3,4-d) Pyrimidine (0.1% in Propylene Glycol) | 0.2 |
| | 100.2 |

Use of the 2-Methyl-5,7-dihydrothieno (3,4-d) Pyrimidine causes the flavor to have a distinctly "natural" quality; much more so than if the material were omitted.

What is claimed is:

1. 2-methyl-5,7-dihydrothieno-(3,4d)-pyrimidine having the structure:

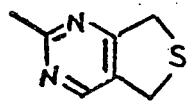

* * * * *